Feb. 24, 1931.  J. L. DRAKE ET AL  1,793,783
DRAW TABLE AND DRIVE THEREFOR
Filed June 10, 1925  2 Sheets-Sheet 1

INVENTORS.
John L. Drake.
Edwin A. Rosin.
Frank Fraser,
ATTORNEY.

Feb. 24, 1931.   J. L. DRAKE ET AL   1,793,783
DRAW TABLE AND DRIVE THEREFOR
Filed June 10, 1925   2 Sheets-Sheet 2

INVENTORS.
John L. Drake.
Edwin A. Rosin.
Frank Fraser.
ATTORNEY.

Patented Feb. 24, 1931

1,793,783

UNITED STATES PATENT OFFICE

JOHN L. DRAKE AND EDWIN A. ROSIN, OF TOLEDO, OHIO, ASSIGNORS TO LIBBEY-OWNES-FORD GLASS COMPANY, OF TOLEDO, OHIO, A CORPORATION OF OHIO

DRAW TABLE AND DRIVE THEREFOR

Application filed June 10, 1925. Serial No. 36,180.

The present invention relates to sheet glass apparatus, and has particular reference to a draw-table and driving mechanism therefor.

An important object of the invention is to provide a draw-table for use in sheet glass apparatus, said draw-table being so constructed that it will present a substantially unbroken surface upon which the sheet may be supported without injury.

Another object of the invention is to provide a draw-table for use in sheet glass apparatus comprising a plurality of interlocking links pivotally connected and so associated that a substantially unbroken surface will be presented upon which the sheet of glass may be supported, the said draw-table being driven by means of drums having irregular surfaces.

Other objects and advantages of the invention will become apparent during the course of the following description.

Figure 1:
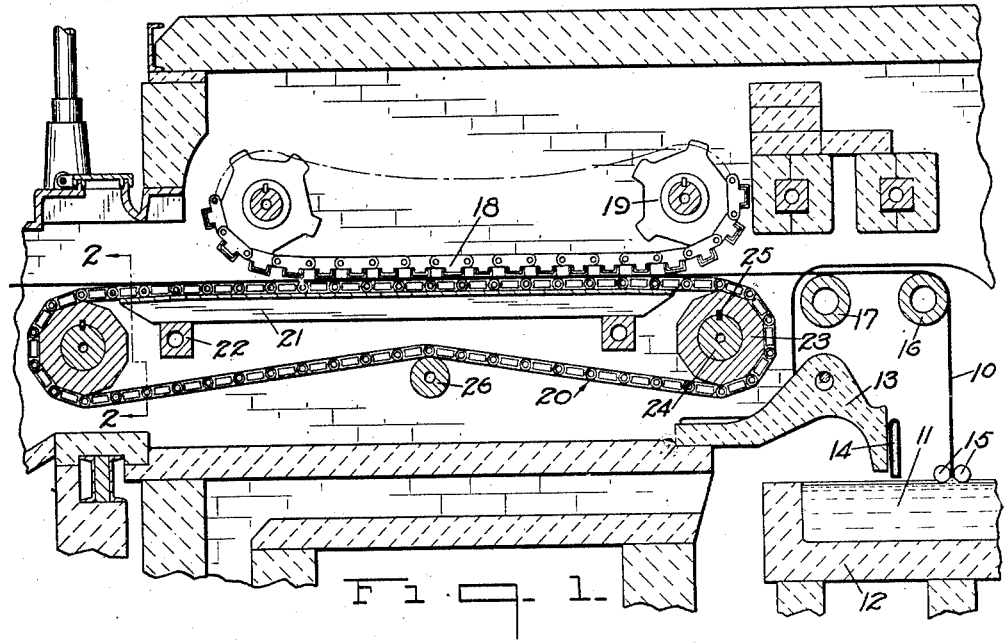
Figure 2:
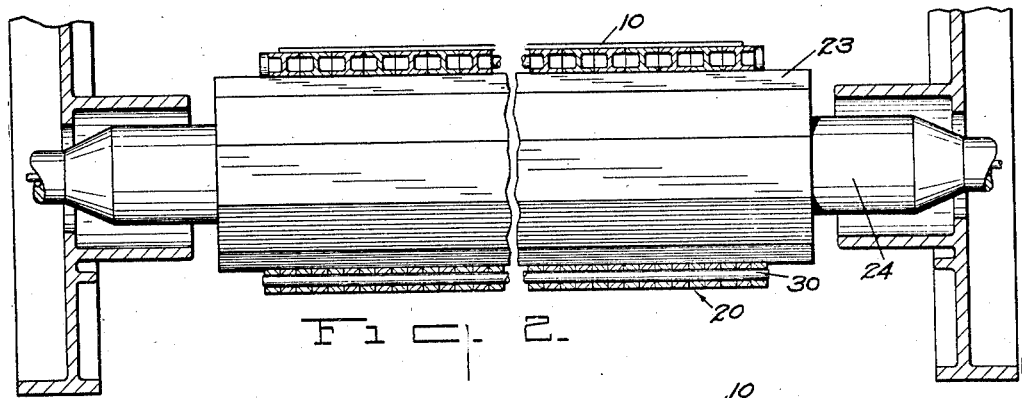
Figure 3:
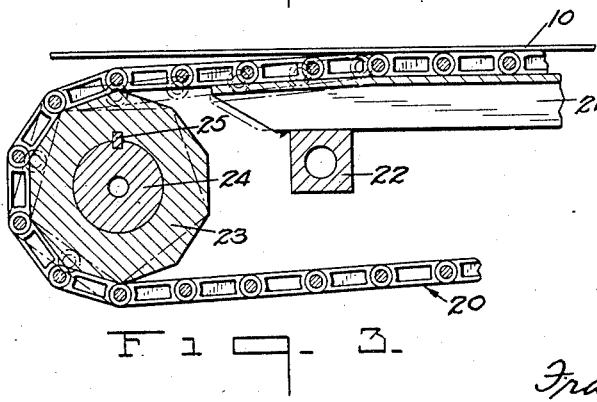
Figure 4:
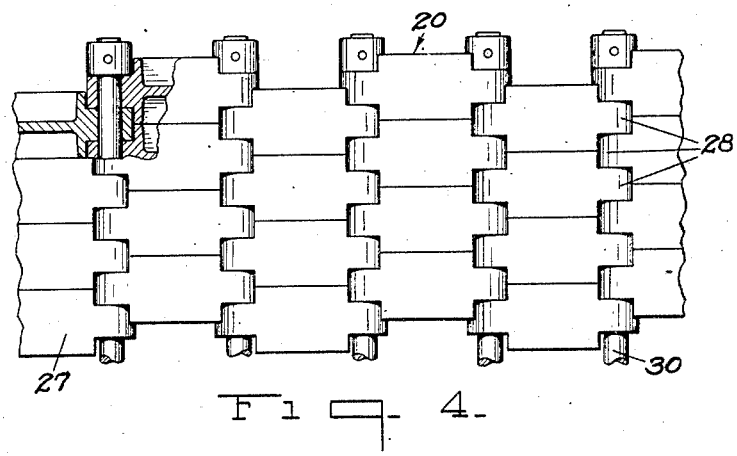
Figure 5:
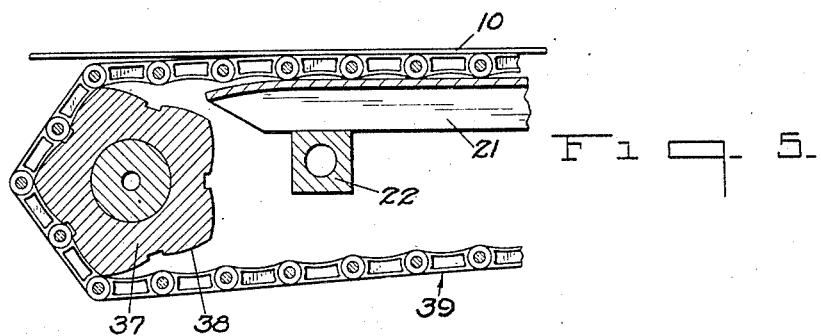
Figure 6:
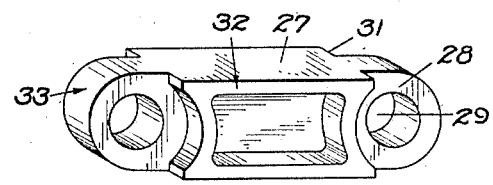
Figure 7:
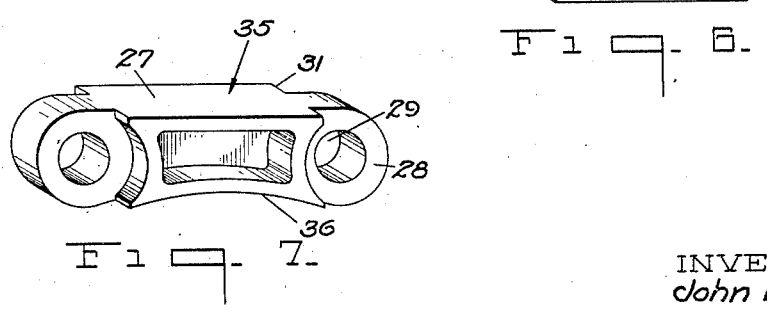

In the drawings wherein like numerals are employed to designate like parts throughout the same, Fig. 1 is a vertical longitudinal section through a portion of a sheet glass drawing apparatus illustrating our improved device in use, Fig. 2 is a transverse section of the draw-table, the driving mechanism being in elevation, Fig. 3 is a fragmentary view of the driving mechanism, Fig. 4 is a top plan view of the draw-table, Fig. 5 is a vertical section through a slightly modified form of construction, Fig. 6 is a perspective of one form of link which may be used, and Fig. 7 is a similar view of a slightly modified form of link.

In the Colburn machine set forth in Colburn Patent 1,248,809, granted December 4, 1917, a sheet 10 is continuously drawn from a mass of molten glass 11 contained in a draw-pot 12. A suitable lip-tile 13 and lip-tile cooler 14 is provided to assist in properly conditioning the glass to permit the sheet to be drawn therefrom. Edge-engaging means 15 are provided to make it possible to draw a sheet continuously from a mass of molten glass without narrowing at its base. The sheet is initially drawn in the vertical plane after which it is deflected over a roll 16 and then passed over an idler roll 17. A draw-table is used in combination with the clamp bars 18 to draw the sheet and to flatten the same. The clamp bars 18 are so constructed that they engage or clamp the edges formed by the knurled rolls 15 and are driven by means of the sprockets 19. The sheet is then permitted to pass through an annealing leer, after which it is cut up into commercial sizes as will be readily understood. The annealing leer and cutting apparatus are not shown in the drawings. The type of draw-table disclosed in the Colburn patent is not entirely satisfactory because of its construction. This draw-table comprises a plurality of straight sided links pivotally connected, being so connected that a relatively large gap is formed between adjacent links.

The sheet of glass supported upon the draw-table, which may sometimes be called a flattening table, is comparatively soft so that it is susceptible to any surface distortion. Being soft, the glass will have a tendency to sag within the gaps between the ends of adjacent links, thus creating surface irregularities in the sheet. In addition to the tendency to sag in the gaps, hot gases are permitted to blow up against the sheet forming puffed places. It is common practice to control the temperature of the glass so that the glass will be in a condition susceptible to flattening, but not likely to sag in the gaps above referred to. The limits between these two conditions are close, and it is difficult to control the temperature exactly so that oftentimes the sheet will sag in the gaps between the links or become puffed by reason of the gases blowing on the sheet.

It is an aim of the present invention to construct a draw-table in a manner that a much hotter sheet of glass can be carried thereby without much danger of surface imperfections being formed in the said sheet.

In Fig. 1 the numeral 20 designates the draw-table in its entirety, and it is composed of a plurality of interlocking links so connected as to form an endless belt formation.

Arranged within the loop of the draw-table 20 and adapted to support the draw-table in its upper horizontal run, draw-table rails 21 are provided and are supported upon the beams 22.

The draw-tables used in the Colburn machine are driven by sprockets, the teeth of the sprockets engaging the draw-table in the gaps formed between the links. In the present invention, because of the construction of the draw-table links, I have provided drums 23 carried upon the shafts 24. The drums 23 are provided with a plurality of flat sides, the width of each side of the drum being substantially the same distance as the space between the pivot points of the links used in the draw-table. The drum 23 is keyed to the shaft 24 by the locking key 25. A roll 26 is used to contact with the draw-table during its lower run to keep the draw-table taut. As the surface of the links must be highly polished and flat, and as the idler tightener 26 engages with the sheet engaging surfaces of the links, it is preferable that the roll be formed from some material which will not affect the polish of said links.

Fig. 6 shows the type of link used with the drum 23. This link comprises a body portion 27 carrying the ears 28 provided with the openings 29. The pivot pins 30 in Fig. 4 are threaded through the openings 29 in the links. The ends or ears 28 of the links are reduced in width leaving the shoulders 31, so that when the links are assembled to form the draw-table the adjacent edges 32 of adjoining links may contact, while the space between the ears 28 of the two links will be filled up by the ear 28 of the link in the next row. In other words, the width of the shoulder 31 will be approximately one-half the width of the ears 28. The ears will be provided with the curved surface 33 to permit the links to be rocked upon the pins 30 in a manner that they will not cause the sheet to be shoved above the horizontal plane in which the upper surface of the draw-table is disposed when upon the rails 21. By using the links formed as shown in Fig. 6, so that the top and bottom will be substantially the same width, the draw-table will be as strong mechanically as the type shown in the Colburn patent, while at the same time there will be no large gaps between links in which the sheet can sag. Because of the arrangement of the links as shown in Fig. 4, a substantially unbroken surface will be presented for the sheet to rest upon.

In Figs. 5 and 7 a slightly modified form of construction is shown wherein the link 35 is provided with the curved under-surface 36. The drum 37 is provided with the plurality of curved faces 38, the curved faces 38 being adapted to fit in and engage the surfaces 36 on the links. Fig. 5 clearly shows the method of driving the draw-table 39 formed from the links having the curved under surface. Although the term flat sided drum has been used, this is not to be taken literally to means absolutely flat. In other words, the form shown in Fig. 5 is intended to be included in this terminology, and in fact any form of drum whose periphery is not annular is included.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. A metallic link for an endless belt glass supporting table having a body portion consisting of spaced top and bottom walls, a web connecting said walls, curved end walls connecting the top and bottom walls, ears projecting longitudinally from the end walls of less width than the top wall, each provided with a transverse opening, the distribution of the metal in at least the top and bottom walls being such as to minimize any tendency toward warping in the presence of glass working temperatures.

2. An endless belt table comprising a plurality of links interconnected to form a substantially continuous and unbroken plane supporting surface when in horizontal position, each link having a body portion and reduced end portions provided with transverse openings, the outside surface of the end portion forming an unbroken continuation of the top surface of the body portion, the body portion being undercut adjacent the end portions to receive a part of the corresponding end portion of the preceding or following link, and to provide a substantially thin transverse end of the top surface of the body portion, and a pin located in said opening for holding said links in interconnected position.

3. In sheet glass apparatus, a flattening table comprising a plurality of links arranged in transverse rows, the links in one row having portions interlocking with portions of the adjacent rows, the supporting surface of each link being arranged in staggered relation with respect to longitudinal adjacent links, and forming a continuation of at least a portion of the surface of the longitudinal adjacent links, means passing through said interlocking portions to join said rows of links into an endless belt formation, a horizontally disposed table support also arranged within the loop formed by the links for supporting the table during its upper horizontal run, and a drum arranged within the loop engaging the table and frictionally driving the same.

4. In sheet glass apparatus, a draw table comprising a plurality of links associated with one another to form a substantially unbroken plane surface, each link being arranged in staggered relation with respect to longitudinal adjacent links, the supporting surface of each link forming a continuation of at least a portion of the surface of the longitudinal adjacent links, and a drum extending transversely the entire width of the table surface and provided with a plurality of flat faces extending the entire length thereof and frictionally engaging the table for driving the same.

5. In sheet glass apparatus, a horizontal support having a plane supporting surface, a plurality of links arranged in transverse rows and providing a longitudinally extending supporting table, the links in one row having portions interlocking with portions of adjacent rows, each link having its supporting surface substantially the same distance from the horizontal support as adjacent links, said supporting surfaces of each link being arranged in staggered relation with respect to longitudinal adjacent links, the surface of each link forming a continuation of at least a portion of the surface of the longitudinal adjacent links whereby to provide a substantially continuous and unbroken surface throughout the area of the supporting table, means passing through said interlocking portions to join said rows of links into an endless table formation, and a drum arranged with a loop formed by the links provided with a plurality of surfaces for engaging the under surface of the links and frictionally driving the same.

Signed at Toledo, in the county of Lucas, and State of Ohio, this 8th day of June, 1925.

JOHN L. DRAKE.
EDWIN A. ROSIN.